(12) United States Patent
Roach et al.

(10) Patent No.: US 9,371,123 B2
(45) Date of Patent: Jun. 21, 2016

(54) SYSTEM FOR CONSTRUCTING BALLOON ENVELOPES

(71) Applicant: Google Inc., Mountain View, CA (US)

(72) Inventors: Kevin Roach, Boulder Creek, CA (US); Jeffrey Neri, Gardnerville, NV (US); Daniel Henry Fourie, San Jose, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/338,756

(22) Filed: Jul. 23, 2014

(65) Prior Publication Data

US 2015/0174817 A1 Jun. 25, 2015

Related U.S. Application Data (60) Provisional application No. 61/918,772, filed on Dec. 20, 2013.

(51) Int. Cl.
*B29C 65/00* (2006.01)
*B64B 1/58* (2006.01)
(Continued)

(52) U.S. Cl.
CPC . *B64B 1/58* (2013.01); *B29C 65/18* (2013.01); *B29C 65/226* (2013.01); *B29C 65/30* (2013.01);
(Continued)

(58) Field of Classification Search
CPC ...... B29C 65/18; B29C 65/226; B29C 65/30; B29C 65/743; B29C 65/7802; B29C 65/7847; B29C 66/0044; B29C 66/1122; B29C 66/244; B29C 66/3452; B29C 66/836; B29C 66/86533; B29C 66/9672; B29L 2022/022; B64B 1/14; B64B 1/58; B64B 1/40

USPC ............. 156/251, 269, 271; 244/30, 31
See application file for complete search history.

(56) References Cited

U.S. PATENT DOCUMENTS 2,635,671 A * 4/1953 La Mere et al. ............... 156/539
2,656,293 A 10/1953 Huch
(Continued)

FOREIGN PATENT DOCUMENTS

| CN | 102178996 A | 9/2011 |
|---|---|---|
| JP | 09-056934 | 3/1997 |

OTHER PUBLICATIONS

A. L. Morris. "Scientific Ballooning Handbook." NCAR Technical Note. Atmospheric Technology Division, National Center for Atmospheric Research. May 1975, 258 pages.
(Continued)

*Primary Examiner* — George Koch
(74) *Attorney, Agent, or Firm* — Lerner, David, Littenberg, Krumholz & Mentlik, LLP (57) ABSTRACT

An assembly for use during manufacture of a balloon envelope that includes a table having first and second levels, an indicator disposed on the first level and a sealing component. The first level is arranged to receive a first sheet portion of material. The indicator is arranged along a lengthwise axis of the table to indicate a position for attaching a tendon to the first sheet portion. The second level is arranged to receive assembled gore portions of the envelope comprising the first sheet portion, the tendon and a second sheet portion material. The sealing component is configured to move along the table and to apply a heat seal to bond together the first and second sheet portions disposed thereon in order to form at least part of a gore portion of the envelope, such that the tendon is arranged proximate to a centerline of the gore.

20 Claims, 10 Drawing Sheets

(51) Int. Cl.
  *B29L 22/02* (2006.01)
  *B29C 65/18* (2006.01)
  *B29C 65/22* (2006.01)
  *B29C 65/30* (2006.01)
  *B29C 65/74* (2006.01)
  *B29C 65/78* (2006.01)

(52) U.S. Cl.
  CPC .......... *B29C 65/743* (2013.01); *B29C 65/7802* (2013.01); *B29C 65/7847* (2013.01); *B29C 66/0044* (2013.01); *B29C 66/1122* (2013.01); *B29C 66/133* (2013.01); *B29C 66/244* (2013.01); *B29C 66/3452* (2013.01); *B29C 66/836* (2013.01); *B29C 66/86533* (2013.01); *B29C 66/9672* (2013.01); *B29L 2022/022* (2013.01)

(56) References Cited

U.S. PATENT DOCUMENTS

| | | | |
|---|---|---|---|
| 2,666,600 A | 1/1954 | Huch et al. | |
| 2,679,224 A | 5/1954 | Sturtevant | |
| 2,703,769 A * | 3/1955 | Stinger | B29C 65/02 156/226 |
| 2,767,941 A * | 10/1956 | Gegner et al. | 244/31 |
| 2,790,479 A | 4/1957 | Mastenbrook | |
| 3,047,252 A | 7/1962 | Huch et al. | |
| 3,149,017 A | 9/1964 | Ehrreich et al. | |
| 3,269,884 A | 8/1966 | Slater | |
| 3,558,083 A | 1/1971 | Conley et al. | |
| 4,877,205 A * | 10/1989 | Rand | 244/31 |
| 4,911,380 A | 3/1990 | Regipa | |
| 5,061,331 A * | 10/1991 | Gute | 156/64 |
| 2009/0002257 A1* | 1/2009 | de Jong | B64G 1/222 343/872 |
| 2011/0108612 A1 | 5/2011 | Nickell et al. | |

OTHER PUBLICATIONS

P. G. Scott et al. "Long Duration Balloon Technology Survey." Final Report: Report No. WII-9942-01-TR-01. Wizen International, Inc. Mar. 11, 1989, 66 pages. Retrieved from: <http://www.dtic.mil/dtic/tr/fulltext/u2/a206975.pdf>.

Winker, J. A. Pumpkins and Onions and Balloon Design. Advances in Space Research. vol. 30, No. 5. © 2002, pp. 1199-1204.

Yajima, N. A New Design and Fabrication Approach for Pressurized Balloon. Advances in Space Research. vol. 26, No. 9. © 2000, pp. 1357-1360.

International Search Report & Written Opinion dated Mar. 31, 2015 for Application No. PCT/US2014/069933.

* cited by examiner

SYSTEM FOR CONSTRUCTING BALLOON ENVELOPES

CROSS-REFERENCE TO RELATED APPLICATIONS

The present application claims the benefit of the filing date of U.S. Provisional Patent Application No. 61/918,772 filed Dec. 20, 2013, the disclosure of which is hereby incorporated herein by reference.

BACKGROUND

Computing devices such as personal computers, laptop computers, tablet computers, cellular phones, and countless types of Internet-capable devices are increasingly prevalent in numerous aspects of modem life. As such, the demand for data connectivity via the Internet, cellular data networks, and other such networks, is growing. However, there are many areas of the world where data connectivity is still unavailable, or if available, is unreliable and/or costly. Accordingly, additional network infrastructure is desirable.

Some systems may provide network access via a balloon network operating in the stratosphere. Because of the various forces experienced by these balloons during deployment and operation, there is a balancing of needs between flexibility and stability of materials. As such, the balloons include a number of components, such as a flexible envelope made of material that may be configured in sections or lobes to create a "pumpkin" or lobed balloon, and a plurality of tendons to support the lobes.

Typically, these components of the balloon envelope are assembled before the balloon can take flight. When this assembly technique is performed manually, the efforts can become extremely time-consuming and lack consistency.

BRIEF SUMMARY

Aspects of the present disclosure are advantageous for providing an assembly for use during manufacture of a balloon envelope. In one embodiment, the assembly includes a table component having first and second levels, an indicator disposed on the first level and a sealing component. The first level is arranged to receive a first sheet portion of material. The indicator is arranged along a lengthwise axis of the table component to indicate a position for attaching a tendon to the first sheet portion. The second level is arranged to receive assembled gore portions of the envelope comprising the first sheet portion, the tendon and a second sheet portion of material. The sealing component is configured to move along the table and to apply a heat seal to bond together the first and second sheet portions disposed thereon. This may form at least part of a gore portion of the envelope, such that the tendon is arranged proximate to a centerline of the gore.

In one example, the sealing component is further configured to cut the first and second sheet portions at an edge of each sheet. A track may be arranged along the lengthwise axis of the table component. The sealing component can be configured to move along the track in order to heat seal the first and second sheet portions together.

In another example, the table component includes a covering material that allows the first sheet portion to slide across the first level. The assembly may also include an airflow unit. The airflow unit, when activated, causes an amount of airflow to temporarily hold the first sheet portion in place relative to the first level of the table component. In that regard, the covering material can be configured to allow airflow from the airflow unit to reach the first sheet portion disposed on the first level of the table component.

In yet another example, a feeding track may be attached to the first level of the table component. The feeding track can be arranged to guide a given tendon lengthwise within the indicator disposed on the first level.

In another embodiment, a system may be provided. The system includes a balloon having a balloon envelope and an assembly for use during manufacture of the balloon envelope. The assembly includes a table component having first and second levels, an indicator disposed on the first level and a sealing component. The first level is arranged to receive a first sheet portion of material. The indicator is arranged along a lengthwise axis of the table component to indicate a position for attaching a tendon to the first sheet portion. The second level is arranged to receive assembled gore portions of the envelope comprising the first sheet portion, the tendon and a second sheet portion of material. The sealing component is configured to move along the table and to apply a heat seal to bond together the first and second sheet portions disposed thereon. This may form at least part of a gore portion of the envelope, such that the tendon is arranged proximate to a centerline of the gore.

In yet another embodiment, a method of manufacturing a balloon envelope may be provided. The method includes arranging a first sheet portion of material across a table having first and second levels and an indicator disposed on the first level. The first level may be arranged to receive a first sheet portion of material. The indicator may be arranged along a lengthwise axis of the table to indicate a position for attaching a tendon to the first sheet portion. The second level may be arranged to receive assembled gore portions of the balloon envelope comprising at least the first sheet portion, the tendon and a second sheet portion of material. The first sheet portion may be secured to the first level of the table. A tube portion having the tendon disposed therein may be adhered to the first sheet portion such that the tube portion is aligned with the indicator. The second sheet portion of the material may be positioned over the first sheet and tube portions arranged on the table. Using a heat sealing device, the first and second sheet portions are joined together. The joined first and second sheet portions forming at least part of the gore portion of the balloon envelope such that the tendon in the tube portion is arranged proximate to a centerline of the gore portion.

DETAILED DESCRIPTION

The present disclosure generally relates to providing a system for manufacturing balloon envelopes for use with high-altitude balloons in communication networks. In some situations, the communication networks may include many thousands of balloons that are deployed in the stratosphere at the same time. To increase the overall efficiency in manufacturing large quantities of balloons, the features described herein may provide a repeatable and automated process. These feature may also help minimize imprecision and damage that can be caused by human contact.

In one embodiment, each balloon envelope of a balloon includes a plurality of envelope gores. Each envelope gore may include first and second sheet portions of a lightweight film material. The sheet portions may be heat sealed together at an edge of each sheet in order to form at least one gore portion of the plurality of envelope gores. A tube portion having a tendon disposed therein may be adhered to the first sheet portion so that the tendon in the tube portion is straightly arranged at a centerline of the gore. In some aspects, the gores may be constructed using a manufacturing process described in more detail below.

To increase automation of the manufacturing process for gores of the balloon envelopes, the method of manufacturing may include a compact assembly table. This table may be useful in minimizing contact of the balloon envelope with uncontrolled surfaces by allowing the envelope to be built entirely on a surface of the table. This surface of the table may be tightly controlled for cleanliness in order to prevent damage to the balloon envelopes.

According to aspects, the table may include a first and a second level (e.g., a working level and a resting level). The first level of the table is arranged to receive a first sheet portion of material. An indicator may be disposed on a surface of the first level. The indicator is arranged along a length of the table as a holding position for a tendon. For example, the indicator may include line markings that are used to indicate a position for attaching the tendon to the first sheet portion of material.

The second level or lower level trough of the table may be arranged to hold assembled gore portions of the balloon envelope comprising the first sheet portion, the tendon, and a second sheet portion of material. This may allow for a stacking of envelope film during manufacturing a given gore portion without affecting a top layer sheet of film material on the first level of the table.

To assemble a given gore portion of the balloon envelope, the first and second sheet portion of material stretch out on the table may be sealed together, for example, using a heat bond. This heat bond of the material can be implemented using various techniques. In one example, a heat sealer having a track may be used. The heat sealer may be configured to travel along a length of the table by traversing the track. The heat sealer may apply a heat bonding seal in order to join together the first and second sheet portions in a pressing motion, one section at a time. The one section may be a section of the sheet portions corresponding to a given length, such as one meter. In this example, the heat sealer moves, seals and moves again until it completes a full length of the gore portion made from bonding the first and second sheet portions together.

During the manufacturing process, a first sheet portion of the film material may be rolled out across the first level of the table over the indicator. This first sheet portion may be secured to the table using, for example, one or more clamping devices. A tube portion having the tendon disposed therein may be adhered to the first sheet portion such that the tube portion is aligned with the indicator in the table. A second sheet portion of film material may be feed over the first sheet and tube portions lying on the table. Thereupon, these two sheets may be joined together.

To join the sheets of film material several techniques can be used. In one example, a type of heat sealing device can be used to heat bond the film material together. Alternatively, other types of devices may be used, such as with a continuous rolling heat sealer, or various other similar and different heat sealing devices.

The joined first and second sheet portions may form at least part of a gore portion of the balloon envelope, where the tendon in the tube portion is arranged approximate to a centerline of the gore portion. The heat sealing can be further configured to cut the first and second sheet portions at an edge of each sheet so that any remainder, such as unused portions of the first and second sheets, may be removed and discarded without difficulty.

Once the heat sealing device has joined the first and second sheet portions together, the completed gore may be folded in a manner over the tendon and placed onto the second level of the table. This so that the assembled gore portion can sit below the table so as not to affect a sealing geometry of a next top sheet of material to be stretched out onto the first level of the table. The above process of manufacturing a gore portion of the balloon envelope may then be repeated over and over again until there are enough gore portions to complete the balloon envelope assembly.

To help arranged the first sheet portion on the table, in some embodiments the table may be tautly covered with a stretchy material that allows for the film material of the first sheet portion to slide across the table without snagging or bunching up.

To hold the first sheet portion to the table, in some embodiments a vacuum may be used. For example, the stretchy material may also allow airflow, such as from a vacuum placed underneath the table, to flow through the material to the first sheet portion lying on the table. In this example, when the vacuum is activated the airflow may temporarily hold the first sheet portion in place on the table. In that regard, the stretchy material may be permeable or include a number of holes that allow air to flow through the material.

Aspects, features and advantages of the disclosure will be appreciated when considered with reference to the following description of embodiments and accompanying figures. The same reference numbers in different drawings may identify the same or similar elements. Furthermore, the following description is not limiting; the scope of the present technology is defined by the appended claims and equivalents. While certain processes in accordance with example embodiments are shown in the figures as occurring in a linear fashion, this is not a requirement unless expressly stated herein. Different processes may be performed in a different order or concurrently. Steps may also be added or omitted unless otherwise stated.

Example System

Figure 1:
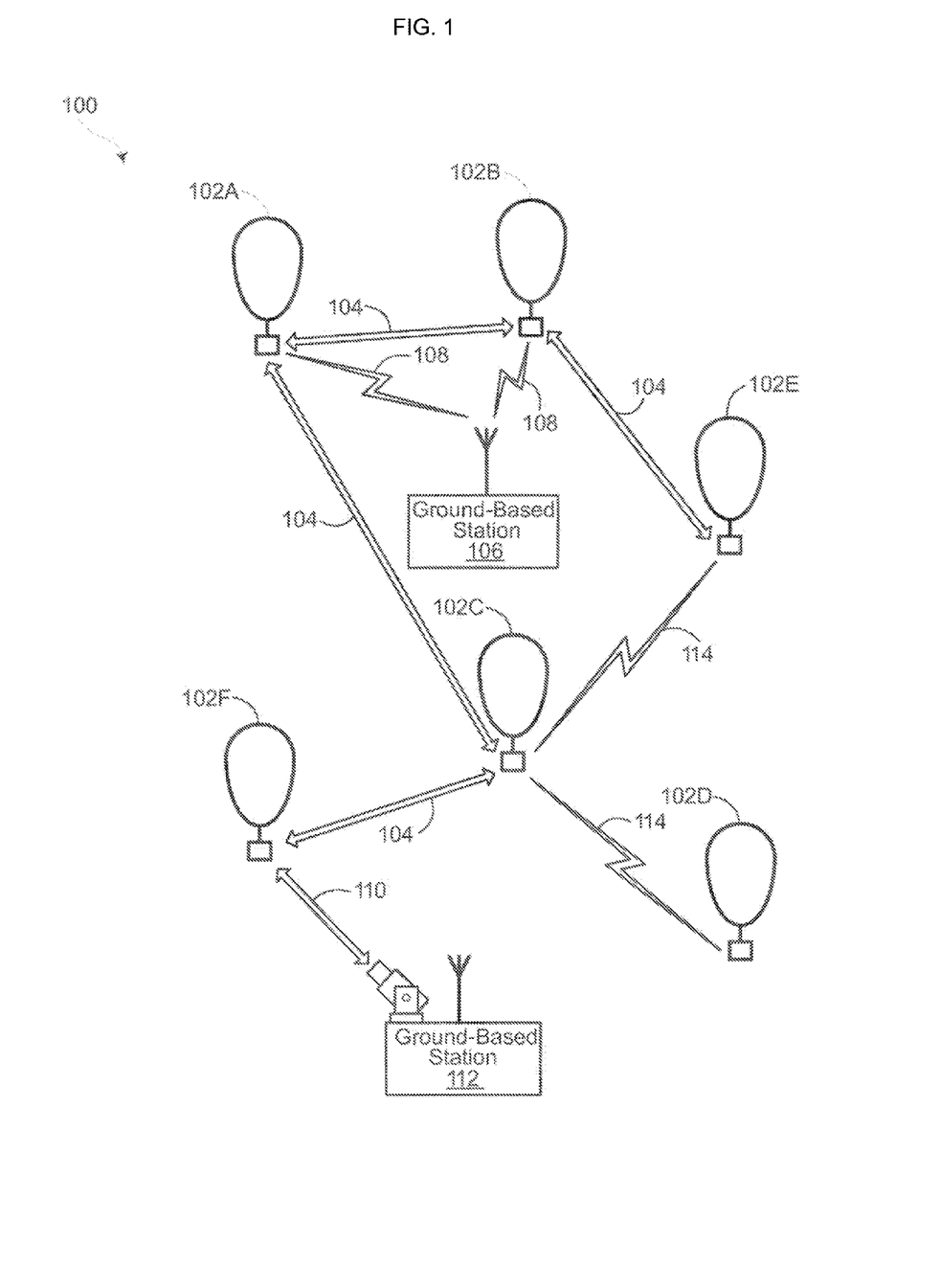
FIG. 1 is a functional diagram of a system in accordance with aspects of the present disclosure.

FIG. 1 depicts an example system 100 in which a balloon as described above may be used. This example should not be considered as limiting the scope of the disclosure or usefulness of the features of the present disclosure. For example, the techniques described herein can be employed on various types of standalone balloons or balloons used with other types of systems. In this example, system 100 may be considered a "balloon network." the balloon network 100 includes a plurality of devices, such as balloons 102A-F, ground base stations 106 and 112 and links 104, 108, 110 and 114 that are used to facilitate intra-balloon communications as well as communications between the base stations and the balloons. One example of a balloon is discussed in greater detail below with reference to FIG. 2.

Example Balloon

Figure 2:
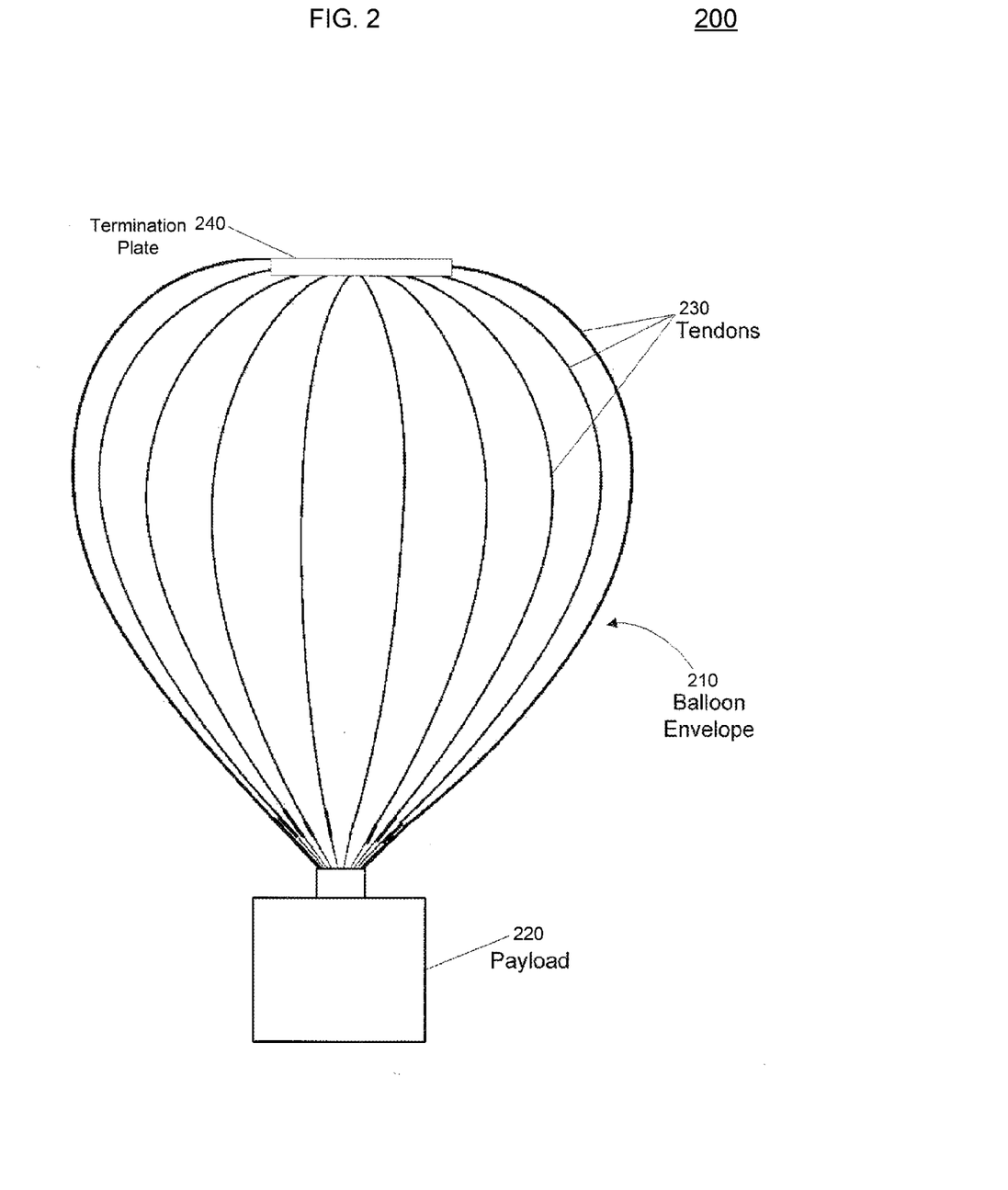
FIG. 2 is an example of a balloon in accordance with aspects of the present disclosure.

FIG. 2 is an example balloon 200, which may represent any of the balloons of balloon network 100. As shown, the balloon 200 includes a balloon envelope 210, a payload 220 and a plurality of tendons 230 attached to the envelope 210 and a termination plate 240.

The balloon envelope 210 may take various forms. In one instance, the balloon envelope 210 may be constructed from materials such as polyethylene that do not hold much load while the balloon 200 is floating in the air during flight. Additionally, or alternatively, some or all of envelope 210 may be constructed from a highly flexible latex material or rubber material such as chloroprene. Other materials or combinations thereof may also be employed. Further, the shape and size of the envelope 210 may vary depending upon the particular implementation. Additionally, the envelope 210 may be filled with various gases or mixtures thereof, such as helium, hydrogen or any other lighter-than-air gas. The envelope 210 is thus arranged to have an associated upward buoyancy force during deployment of the payload 220.

The payload 220 of balloon 200 is affixed to the envelope by a connection such as a cable (not shown). The payload 220 may include a computer system (not shown), having one or more processors and on-board data storage. The payload 220 may also include various other types of equipment and systems (not shown). For example, the payload 220 may include an optical communication system, a navigation system, a positioning system, a lighting system, an altitude control system and a power supply to supply power to various components of balloon 200.

Pressurized lift gas within the balloon envelope 210 may cause a force or load to be applied to the balloon 200. In that regard, the tendons 230 provide strength to the balloon 200 to carrier the load created by the pressurized gas within the balloon envelope 210. In some examples, a cage of tendons (not shown) may be created using multiple tendons that are attached vertically and horizontally. Each tendon may be formed as a fiber load tape that is adhered to a respective envelope gore. Alternately, a tubular sleeve may be adhered to the respective envelopes with the tendon positioned within the tubular sleeve.

Each tendon may be formed as a fiber load tape that is adhered to a respective envelope gore. Alternately, a type of sleeve or tubing may be adhered to the respective envelopes with the tendon positioned therein. In some examples, the tendons 230 may be run from the apex to the bottom of the balloon envelope 210 in order to pick up the load. In normal operations, these tendons 230 need to be kept in place during balloon flight in order to continue to handle the load and maintain the shape of the balloon envelope.

Top ends of the tendons 230 may be coupled together using a type of apparatus, such as termination plate 240, which may be positioned at the apex of balloon envelope 210. In some examples, bottom ends of the tendons 230 may also be connected to one another. For example, a corresponding plate (not shown) may be disposed at a base or bottom of the balloon envelope 210. In some examples, the termination plate 240 at the apex may be the same size and shape as the plate at the bottom of the envelope 210. Both plates may include corresponding components for attaching the tendons 230 thereto.

In view of the goal of making the balloon envelope 210 as lightweight as possible, it may be comprised of a plurality of envelope lobes or gores that have a thin film, such as polyethylene or polyethylene terephthalate, which is lightweight, yet has suitable strength properties for use as a balloon envelope deployable in the stratosphere. In this example, balloon envelope 210 is comprised of a plurality of envelope gores.

Figure 3:
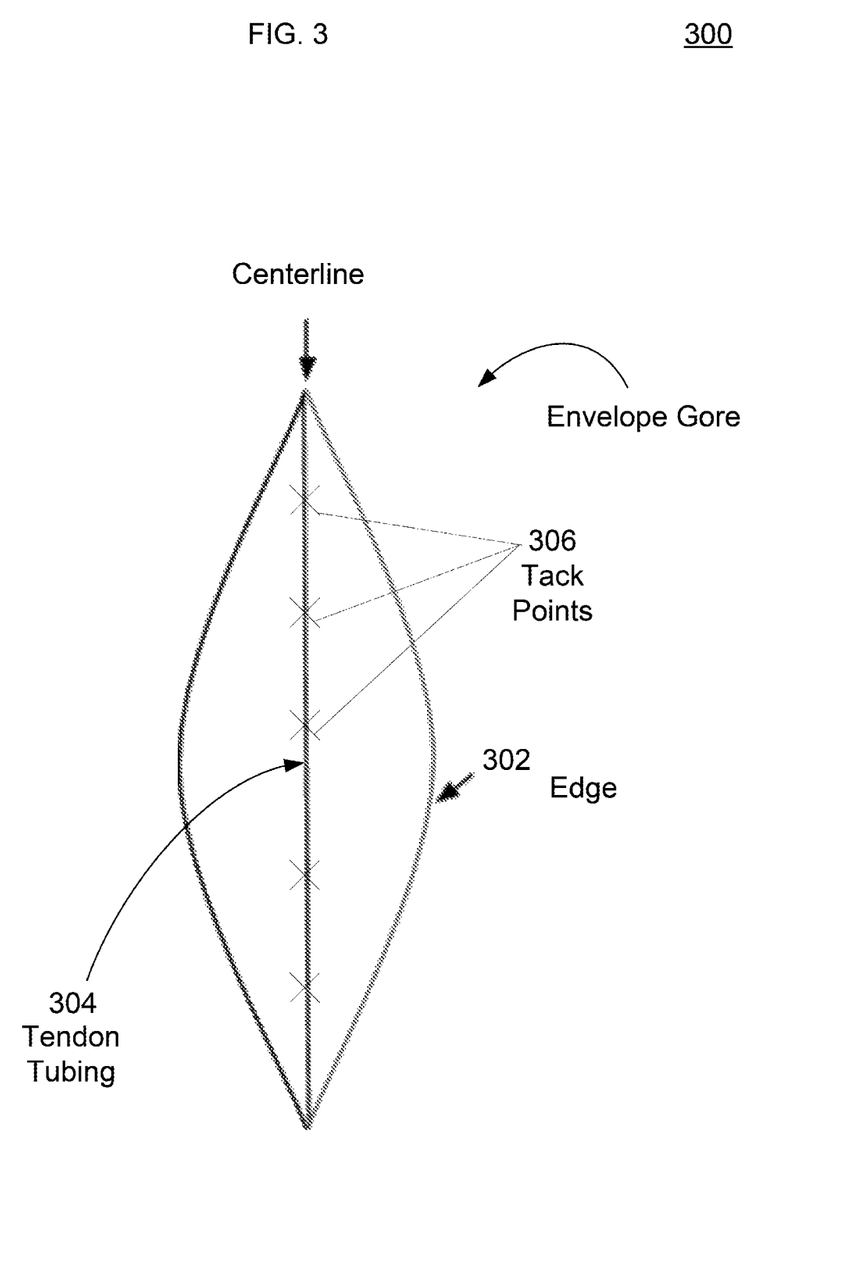
FIG. 3 is an example of an envelope gore in accordance with aspects of the present disclosure.

In FIG. 3, an example of an envelope gore 300 is shown. As shown, the envelope gore 300 may be shaped so that a length of edge seam 302 for connecting adjacent gores of the balloon envelope is greater than a centerline of the gore 300. When the balloon envelope is inflated with lift gas, there may be an excess of envelope gore material that may bulge out somewhat before there is any strain on the envelope material. Because of this, a load may be applied to the shortest section of the envelope gore 300, e.g., the centerline portion of the gore 300.

To help withstand the load caused by the lift gas within the envelope, a tendon 304 may be attached to the centerline of each gore of the envelope. As shown, the tendon 304 may be positioned lengthwise along the centerline. In some embodiments, the tendons may run through tendon tubing. The tendon tubing may be a lightweight clear plastic sleeve of a predetermined thickness, (e.g., 1 mil of polyethylene). Although the tendon 304 can move within the tendon tubing, the tubing can limit this movement so that the tendon 304 stays proximate to the centerline of the envelope gore 302.

In some embodiments, the tendon tubing may be tightened sufficiently around the tendon 304, such as a 2 mm clearance on either side of a 4 mm diameter tendon 304. This is so that the tendon 304 can be held in place due to the friction between the tendon 304 and tubing. Because of this, less tubing material may be required for holding the tendon 304 in place, thereby reducing the likelihood of damage to the envelope gore 300 caused by adhere the tubing to the gore material.

In other embodiments, the tendon may be tacked to the inside of the tendon tubing 304 at a minimum number of tack points 306 (e.g., five). The tack points are used to hold the tendon 304 in place until the tendon tubing is adhered to the envelope gore 300. For example, a type of tape can be used for the tack point where the tape may be designed to fail before connection of the tubing to the envelope gore 300.

In order to adhere the tendon 304 to the envelope gore 300, several techniques may be employed. In one example, tendon tubing comprising the tendon 304 may include a pressure sensitive adhesive (PSA) backing. In this example, a covering for the PSA backing may be removed so that the tendon tubing can be taped along the entire length of the gore 302. In other examples, a heat-sealing method can be used. For example, an automated sealing unit (not shown) can be run along the tendon tubing in order to apply heat of a certain temperature to heat seal the tendon tubing to the envelope gore 300. The tendon 304 may be adhered to the envelope gore 300 during a certain manufacturing process. An example of an assembly for use during this manufacturing process is further described below.

Example Assembly

One aspect of the present technology provides an automated assembly for manufacturing envelope gores for balloons. In this example, the assembly includes particular machinery components, such as a compact assembly table and a sealing device.

Figure 4A:
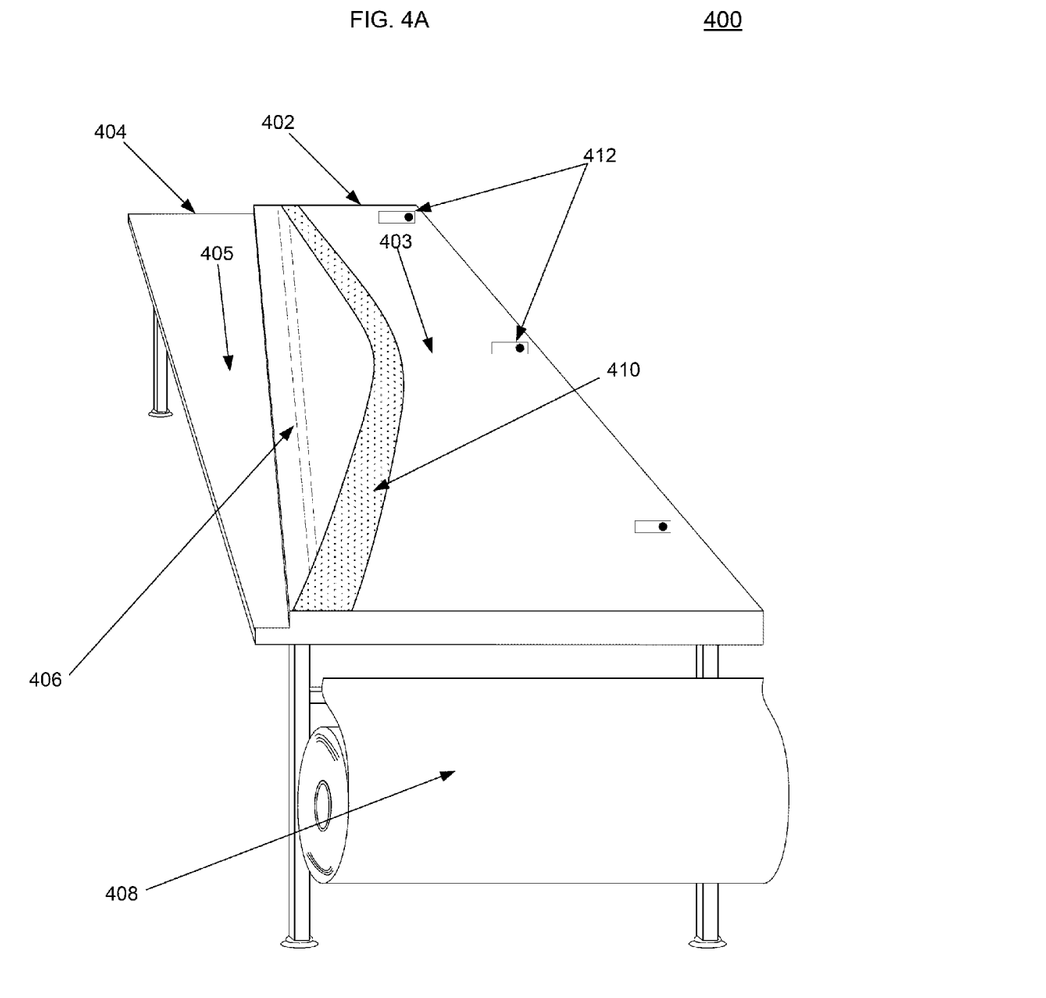
FIG. 4A is an example of a table component in accordance with aspects of the present disclosure.

In FIG. 4A, one example of a table component 400 for the assembly is shown. As shown, the table component 400 includes a first level 402 and a second level 404 and an indicator 406 disposed on a surface 403 of the first level 402. The indicator 406 may be used to mark a position on the table 400 for placing a tendon on an envelope gore being manufactured. The table 400 made me used for shaping and heat-sealing together individual envelope gores made from sheets of balloon material 403 (shown as rolled). In this regard, the table component 400 also includes a curve strip 410 that can be used to indicate where the heat seal may occur, for example, at an edge of the envelope gore created from the roll of balloon material 408.

A sheet of the material 408 may be fed onto the table 400 in order to create a given envelope gore. For example, a straight sheet of the balloon material 408 may be manually rolled out onto the table. As noted above, the balloon material 408 may be of a lightweight material, such as polyethylene, thus allowing for easy manipulation by an operator.

In some embodiments, the balloon material 408 may be attached, for example, to a belt driven track (not shown) for rolling out the material. The belt driven track may include a wheel that can be manually or automatically operated to register a certain distance of material to roll out. This certain distance may correspond to a predetermined length of the balloon material 408 to be cut from the roll. An advantage of the belt driven track is that it helps in the precision of rolling out a right amount of material for each gore as well as limiting the amount of human contact with the material which can cause damage.

Once the balloon material 408 is rolled out, it may be held down on the table component 400 using a series of restraints or clamps 412. The series of clamps 412 may help keep the balloon material 408 from shifting while it is being worked on. Although the clamps 412 may useful in holding down the balloon material 408, some clamps can pinch the material 408 thereby causing a certain amount of damage. For this reason, use of the clamps 412 may be limited to one side of the table 400. For example, the clamps may be arranged along a side of the table 400 where excess sheet material will be cut off in order to shape the sheet into the envelope gore.

As shown in FIG. 4, indicator 406 may be arranged along a lengthwise axis of the table component 400. As noted above, the indicator 406 may be used to indicate position for attaching a tendon to the sheet of balloon material 408 rolled out onto the first level 402. For example, the indicator 406 may include one or more line markings. The line markings may be used for straightly aligning the tendon so that the tendon is positioned proximate to a centerline of the envelope gore. For example, if the tendon is placed within the line markings the tendon may be at the centerline of the envelope gore being manufactured. In this example, the indicator 406 runs diagonally across the table. This diagonal arrangement may help cut down on balloon material 408 waste. For example, by arranging the tendon line diagonally, less material will need to be cutaway in order to form the envelope gore.

First level 402 may be a working area of the table component 400. The first level 402 may include a smooth top layer of a certain material. For example, a top layer of material may cover the surface 403 of the first level 402 and in some embodiments a surface 405 of the second level 404 of the table. The top layer of material may be a smooth material that reduces or even eliminates gross waves in the table 400. In one example, the top layer covering of table component 400 may be a thick layer (e.g., $3/8^{th}$ of an inch) of a compliant material, such as fiberglass and/or silicone, or other types of types of similar materials that have a level of heat resilience.

An advantage of this top layer is that it helps create a lay flat section of the table 400 for laying out sheets of the balloon material 408.

Although the top layer of the table component can be heat resistance, it may not be feasible to heat seal the envelope gores together directly against this material because the gores may be damaged in the process. For example, edges of the envelope gores may become bent and deformed as a result of pressing a heat-sealing device against the table component 400 to create the gores. As a result, the table component 400 may include additional material where the heat seal occurs, such as at curve strip 410.

Curve strip 410 may indicate on table 400 where the heat seal for balloon material 408 occurs. In some embodiments, the curve strip 410 may include additional material, such as fiberglass impregnated with a polytetrafluoroethylene (PTFE) coating, which has a higher melting point than the top layer coating of the table component 400. This extra coating may also help prevent the material 408 from sticking to the table 400 due do the heat sealing being conducted at the strip 410.

Second level 404 of the table component 400 may be configured for stacking up assembled envelope gores of the balloon envelope. For example, the second level 404 may include a trough like resting area for holding the envelope gores during manufacture. A surface 405 of the second level 404 may be configured so that the surface is wide enough to stack up a plurality of assembled envelope gores including the tendon attached to each gore portion. At the second level 404, the gores may rest while a different portion of gores for a given balloon envelope are being worked on at the first level 402. An advantage of having the table 400 configured with two levels is that after sheets of the balloon material 408 are heat sealed together, they can be moved out of the way without affecting a top sheet of balloon material from laying flat on the first level.

Figure 4B:
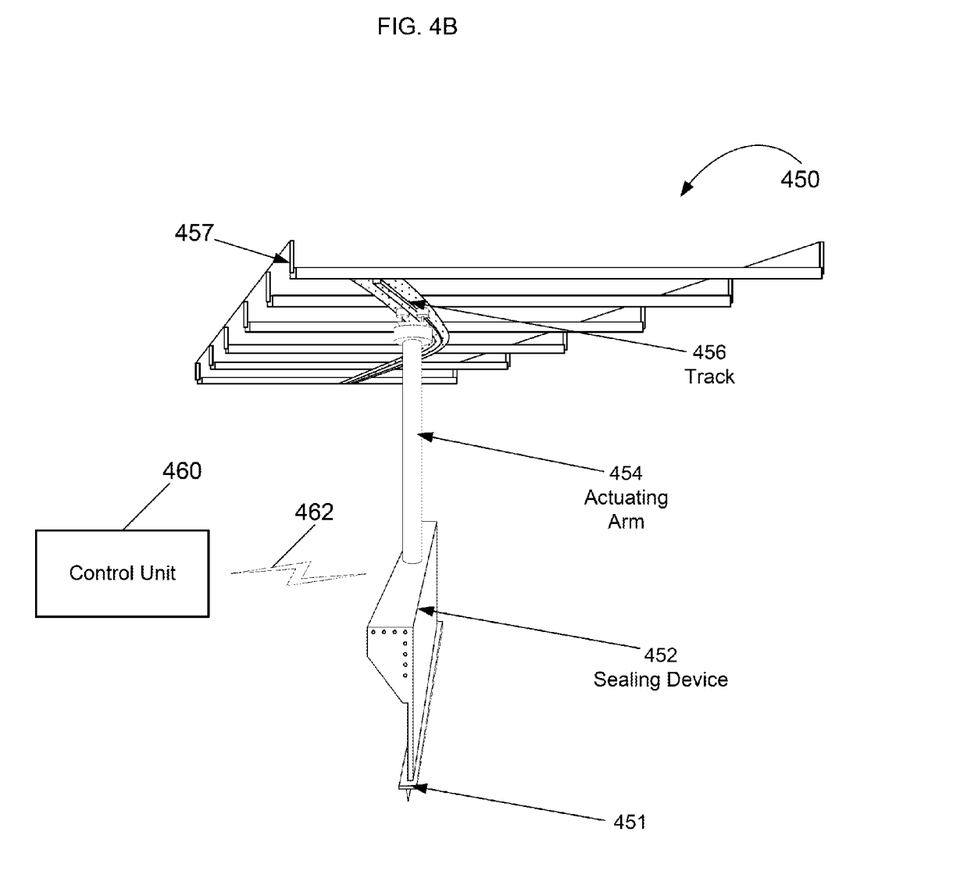
FIG. 4B is an example of a sealing component in accordance with aspects of the present disclosure.

To heat seal sheets of the balloon material 408 together, the assembly may include sealing machinery components. By way of example only, FIG. 4B is an example of a sealing component 450 for the assembly. In this example, the sealing component 450 includes a sealing device 452 coupled to the track 456 via an actuating arm 454. In some examples, a control unit 460 may be utilized for controlling operations of the sealing component 450 using communication link 462, which can be a wired or wireless link.

To communicate with the sealing component 450 using the communication link 462, the component 450 may include communication circuitry (not shown). This communication circuitry may include a receiver/transmitter for processing signals to and from the control unit 460. In some examples, these signals may include commands for the sealing component 450, e.g., to activate the actuating arm 456 and/or to activate heat-sealing operations of the sealing device 452.

Sealing device 452 may include an electrically heatable element 451 disposed on the device. The heatable element 451 may be of a predetermined width and length that may be used to unite layers of the balloon material. For example, the heatable element 451, when activated, for example by a flow of electricity, may reach a certain temperature that is hot enough to heat bond or otherwise melting a section of two sheets of balloon material together. In this regard, the sealing device 452 may be used to press the sheets together in order for the heat bond to activate. In some embodiments, heatable element 451 may have a generally planar surface so that the heat bond may be applied consistently across the section of balloon material currently being bonded. Although a heat activated adhesive or other types of similar adhesives may be used for heat sealing the balloon material, an advantage of melting the sheets together is that it results in a faster and easier process with minimal parts, and may produce a better Coefficient of Thermal Expansion (CTE) match across the bonded material.

In some embodiments, sealing device 452 may provide a combination of operations for heat sealing and cutting of the balloon material 408. For example, the sealing device 452 may be configured to cut the balloon material 408 by using heat and an amount of pressure at the same time as the seal is made. Alternatively, the sealing device 452 may include blade like cutting members (not shown) attached to the heatable element 451. In some embodiments, the cutting members may be attached directly to the sealing device 452 or may be separated from the sealing device 452 and used after the heat bonding is completed. A benefit of configuring the sealing device 452 for cutting is that the balloon material may be immediately cut after being heat bonded. For example, as the sealing device 452 is pressed upon the balloon material, the device may be configured to automatically moved, thereby causing the cutting members to cut away portions of extra material.

In order to move the sealing device 452, track 456 may be used. The track 456 can be mounted on any suitable support. As shown in FIG. 4, track 456 is mounted on an overhead support 457. In some embodiments, the track 456 may be configured so that the sealing device 452 can be guided along a horizontal axis with respect to the support 457. This horizontal axis may correspond to a lengthwise direction of a sheet of balloon material rolled out onto table 400. The track 456 can be configured so that sealing device 452 can move forward and back horizontally by using actuating arm 454. This forward and back movement of the sealing device 452 along track 456 can be manually or automatically operated, for example, by using commands from the communication unit 460.

The sealing device 452 can be mounted to actuating arm 454. As noted above, the arm 454 may allow the sealing device 452 some freedom of movement horizontally along track 456. In some embodiments, the actuating arm 454 can also be activated to cause the sealing device 452 to move vertically. For example, the actuating arm 454 may include housing (not shown) that can extend and retract the arm between first and second positions. In some aspects, extension of the actuating arm 454 allows the sealing device 452 to be pressed against the balloon material in order to cause the heat bond activation. As with the movement along track 452, the actuating arm 454 can extend and/or retract manually, automatically or some combination thereof, for example, by using commands from communication unit 460.

Figure 5:
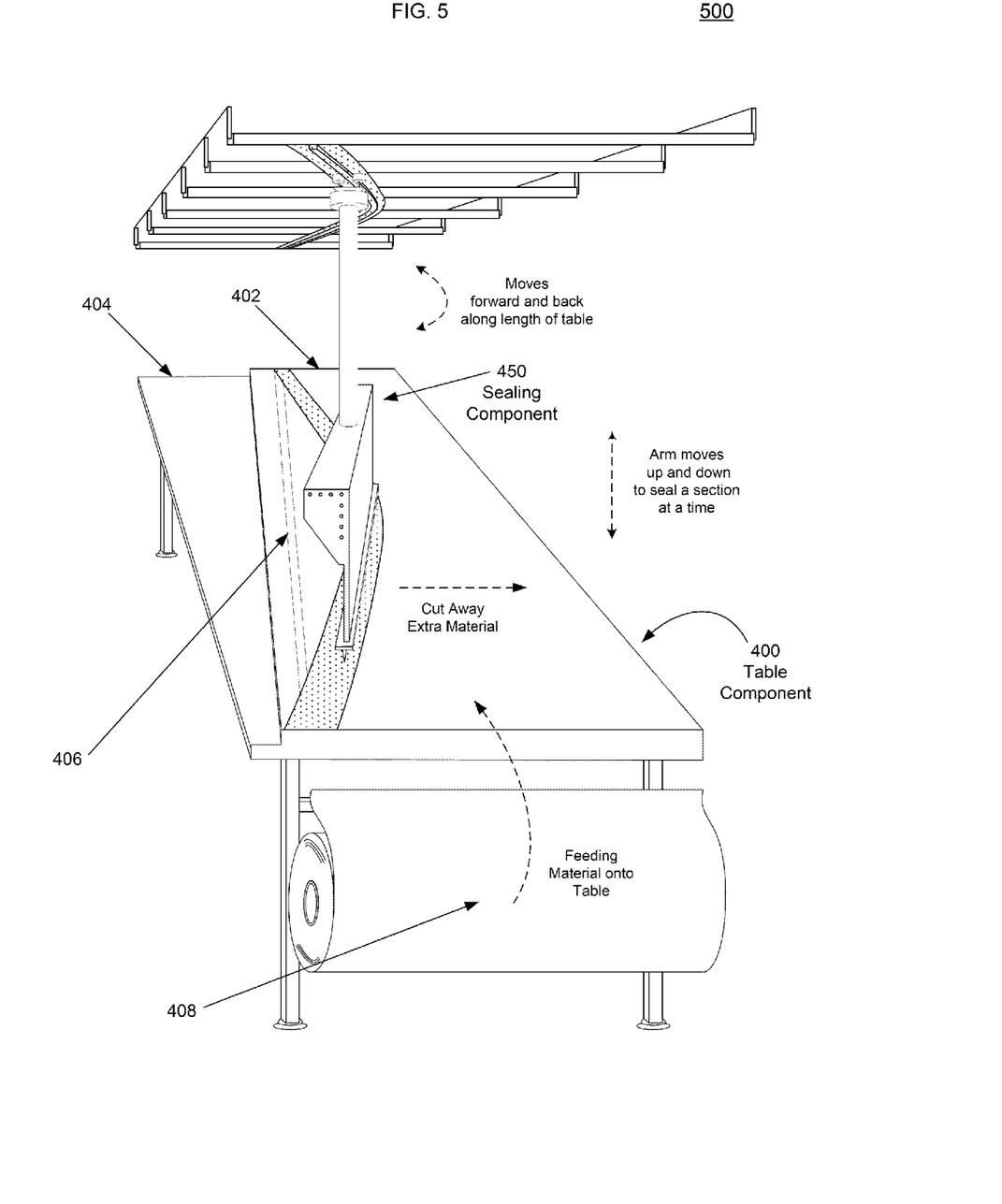
FIG. 5 is an example of a system in accordance with aspects of the present disclosure.

FIG. 5 is an example of an assembly 500, which may include machinery components such as the table component 400 and sealing component 500 as described above. The assembly 500 may be used to manufacture envelope gores for balloons. During the manufacturing process, a first sheet portion of the film material may be rolled out and placed onto the first level 402 of the table 400 over indicator 406. A tendon sleeve portion comprising a tendon may be aligned with the indicator 406 and adhered to the first sheet, for example, by heat sealing or alternatively by removing an adhesive backing from the tendon sleeve and pressing the sleeve onto the envelope gore. A second sheet portion of material 408 may be fed onto the table 400 in order to join it with the first sheet.

To join the sheets of film material together, sealing component 450 may move forward and back from one end of table 400 to an opposite end, thereby traversing along a length of the table 400. The sealing component 450 may operate by heat sealing a section, for example by one meter more or less in length, of the material 408 resting on the first level. For example, sealing component 450 may be pressed down on the table 400 for heating sealing a particular section of the envelope gore material and subsequently lifted up and moved to a next section to be heat sealed. This up, move and down motion of the sealing component 450 can be repeated until the entire length of the laid out material is heat sealed in successive sections resulting in a completed envelope gore.

After completing the envelope gore, extra sheet material not used for the gore may be cut away, for example, by using the cutting element of sealing component 450 or by other techniques. This extra material can be then easily moved out of the way to be discarded or recycled. In some embodiments, an uptake roll can be used to capture or fed in excess or scrap balloon material 408 in order to further reduce material handling.

The completed envelope gores may be moved and stacked onto the second level of the table. Thereupon, successive sheets of balloon material 408 can be rolled out onto the table 400 for manufacturing additional envelope gores to be attached to the balloon envelope. The process of manufacturing envelope gores can be repeated with the successive sheets of material 408 until a sufficient number of gores have been manufactured. An example this assembly process is further described below with respect to FIG. 6.

Figure 6:
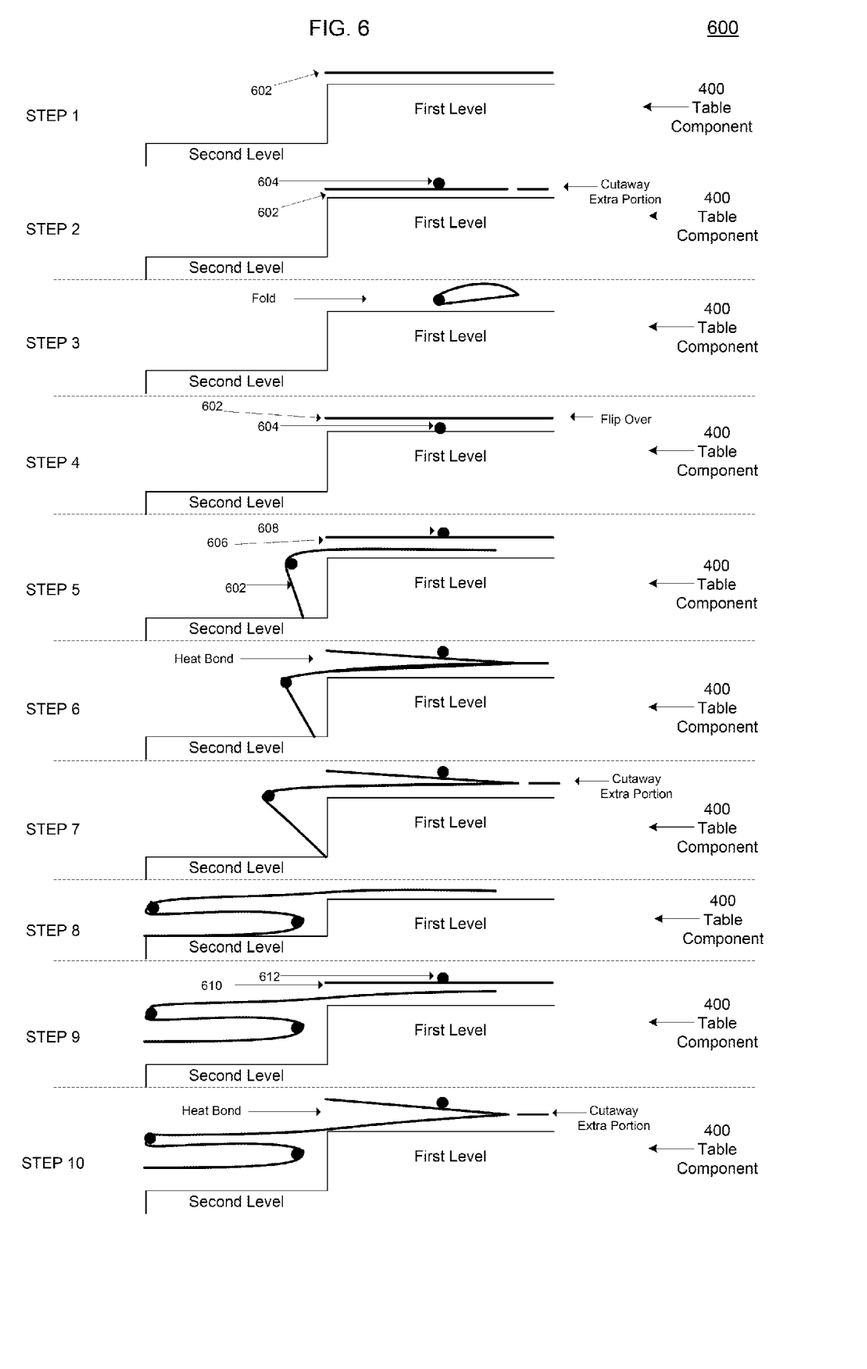
FIG. 6 is an example of a process for assembling envelope gores in accordance with aspects of the present disclosure.

FIG. 6 is an example of a process 600 for assembling envelope gores, for example, by using assembly 500 as described above. At step 1, a first sheet of material 602 may be laid out flat on a first level of table 400. At step 2, a tendon 604 may be adhered to an upper facing portion of the first sheet of material 602. As shown at step 2, the tendon 604 may be initially above the first sheet of material 602. Extra material from this first sheet may be cutaway, for example, using a cutting element. This extra material may be cut way so that an initial edge of the sheet can be formed into the shape of an individual envelope gore. As noted above, the tendon 604 is placed so that it will be proximate to a centerline of this gore when completed.

In some aspects, tendon 604 can also be used to help align the sheet. For example, at step 3, the first sheet of material 602 can be rotated or otherwise folded around the tendon 604. At step 4, the first sheet 602 may be flipped over so that the sheet is positioned on top of the tendon. As a result, the edge of the first sheet 602 that has the envelope gore shape is facing towards the second level of the table 400. This shaped edge of the first sheet including the tendon may be stacked onto the second level so that an unshaped edge of the first sheet 602 is still resting on the first level.

At step 5, a second sheet of material 606 may be laid out flat on the first level of table 400 over a portion of the first sheet 602. A second tendon 608 may be adhered to an upper facing portion of the second sheet of material 606. At step 6, the first and second sheets of material 602 and 606 may be heat bonded together using, for example, a sealing device. At step 7, extra material is cut way in the shape of the envelope gore. It should be noted that in some embodiments the extra material can be cut away simultaneously with the heat bonding of the first and second sheets, for example, by using the sealing device. At step 8, the two sheets 602 and 606 including the attached tendons 604 and 608 are stacked up onto the second level of the table. As shown, an edge of the second sheet 602 may be still resting on the first level. This unshaped edge can be used to connect successive envelope gores.

At step 9, a third sheet of material 610 may be laid out flat on the first level of table 400 over a portion of the second sheet 606. As before, a third tendon 612 may be adhered to an upper surface of the third sheet 610. At stage 10, the third sheet 610 may be heat bonded to the second sheet 610 and formed into the envelope gore shaped by cutting away extra portions of material. As noted above, these steps may be repeated over and over again until a sufficient number of (e.g., approximately 35 more or less) envelope gores for a particular balloon envelope size are manufactured.

The above described process is merely one example process for manufacturing envelope gores using the techniques as described herein, other processes, methods or steps may be added, removed or supplemented for the envelope gore construction. Moreover, some assembly components can be modified or otherwise altered to further increase the efficiency of the envelope gore manufacturing process. Some of these different alternatives are further described below.

Figure 7:
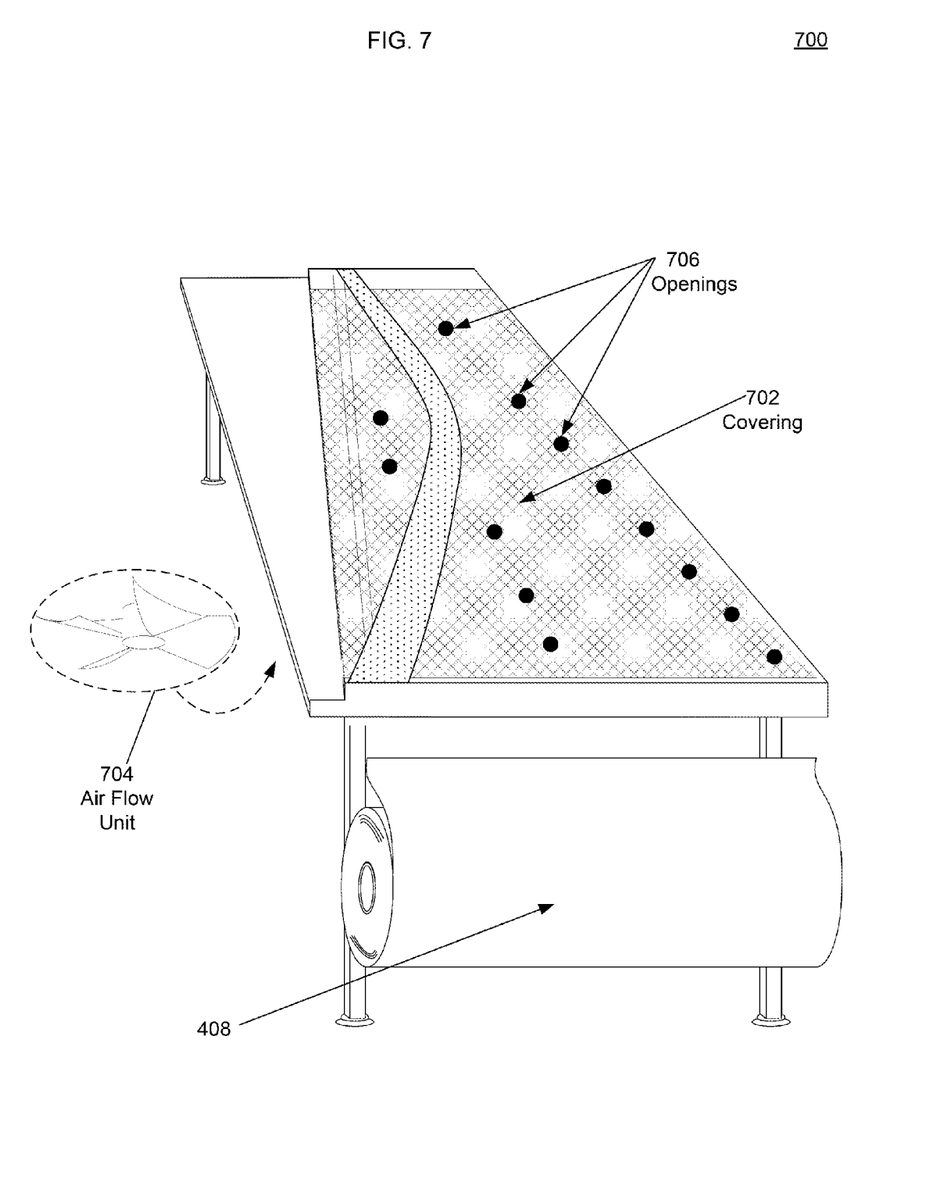
FIG. 7 is another example of a table component in accordance with aspects of the present disclosure.

FIG. 7 is another example of a table component 700 similar to table component 400 that may be used in the manufacturing of envelope gores. In this regard, the features of table component 700 may be used in conjunction with the features of table component 400 as described above. In this example, the table component 700 is modified to facilitate rolling out of the balloon material 408 onto the table component 700. For example, as shown in FIG. 7, the table 700 may include covering material 702. This covering material can be a type of stretchy material, such as polyester blend material, or other types of material with similar properties. The covering material may tautly cover a level of the table 700 and allows a first sheet portion of the balloon material 408 to smoothly slide across that level so that it can be rapidly disposed onto the table 700.

In some embodiments, the modified table component 700 may also include an airflow unit 704. Airflow unit 704 may be configured to temporarily hold the first sheet portion in place relative to a level of the table component 700. For example, the airflow unit 704 may include one or more fans positioned underneath the table 700. The fans can be configured to create a sort of vacuum effect that runs through the table 700 in order to temporarily hold down the first sheet portion of balloon material 408. For airflow to pass through, the table 700 may include a plurality of openings 706 or holes. In this regard, covering material 702 may include a porous weave of the stretchy material to allow the airflow to pass through from below the table 700 in order to reach the first sheet portion disposed on the first level.

Figure 8:
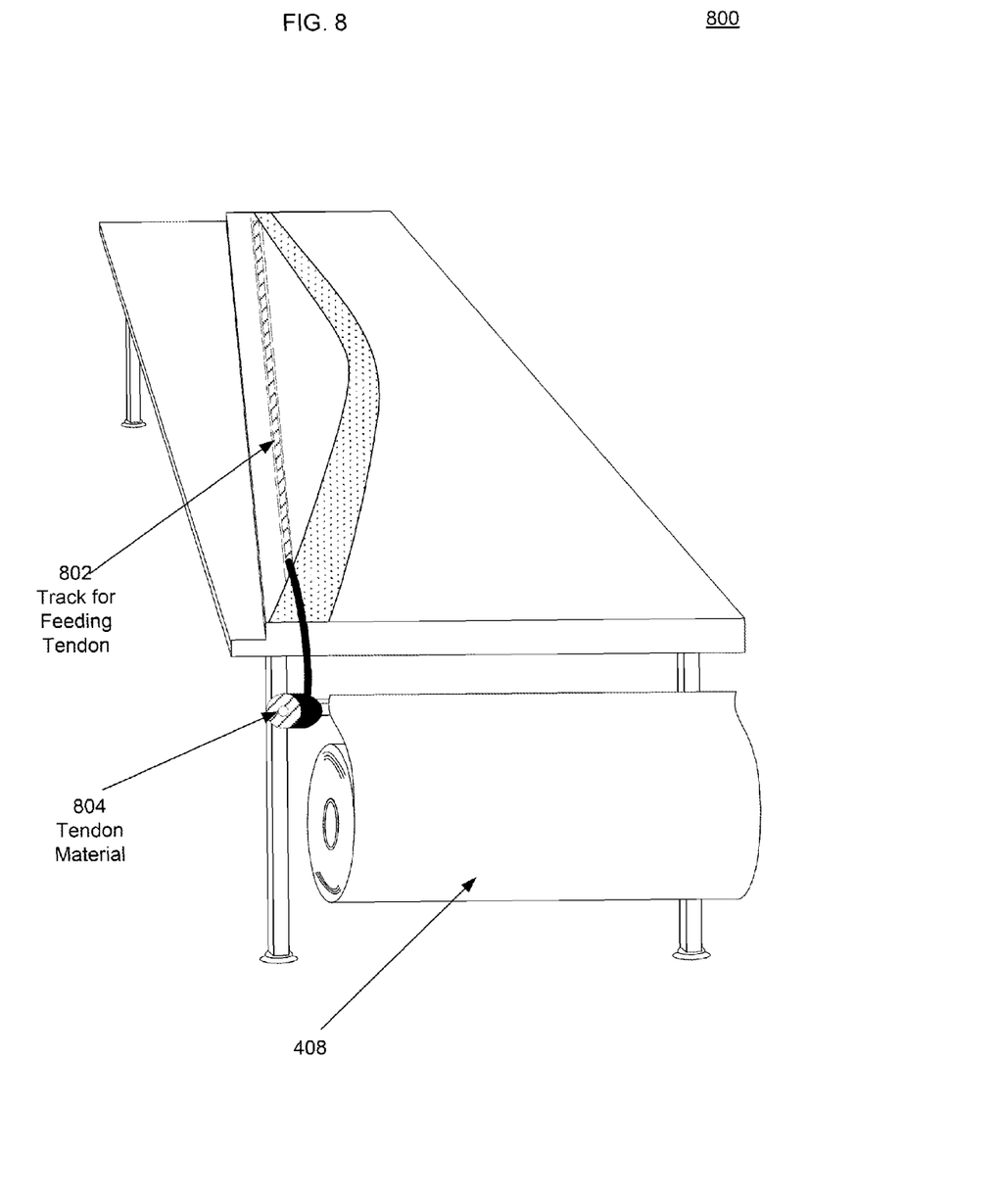
FIG. 8 is yet another example of a table component in accordance with aspects of the present disclosure.

In FIG. 8, yet another example of a table component 800 similar to table component 400 that may be used in the manufacturing of envelope gores. In this regard, the features of table component 800 may be used in conjunction with the features of table component 400 as described above. In this example, the table component 800 is modified to facilitate feeding of tendons. As shown in FIG. 8, a tendon track 802 may be installed for tendon handling along a centerline of the envelope gore. For example, a certain length of tendon material 804 (shown as a roll) may be guided onto the table 700 using track 802. The track 802 may be in a depression or groove in the table sufficient to hold the tendon such as the sheet of balloon material 408 is able to be flush with the surface of table 700.

Once this tendon material 804 is fed across the table 700, the tendon may be attached to the centerline of the envelope gore. In some aspects, the track 802 may be usefully to facilitate manufacturing of envelope gores by helping to automate a line process for attaching tendons to the envelope gore during automated rollout of the balloon material 408 onto the table 700.

Example Flow Diagram

Figure 9:
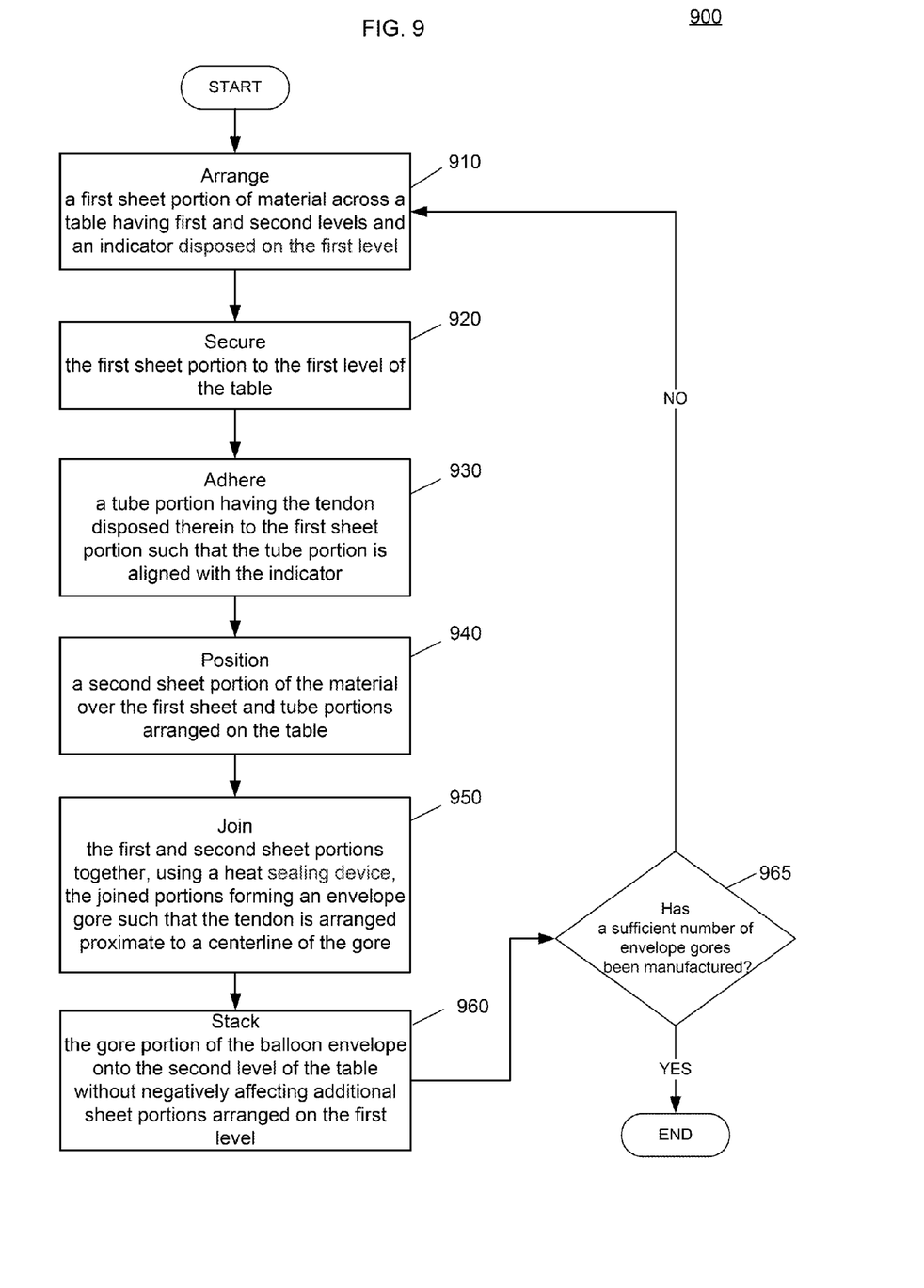
FIG. 9 is an example of a flow diagram in accordance with aspects of the present disclosure.

FIG. 9 is an example of a flow diagram 900 depicting an example of some of the aspects described above for manufacturing balloon envelopes. As previously discussed, the following operations do not have to be performed in the precise order described below. Rather, as mentioned above, various operations can be handled in a different order or simultaneously, and operations may be added or omitted.

In block 910, a first sheet portion of material may be arranged across a table having first and second levels and an indicator disposed on the first level. For example, the first sheet portion may be manually or automatically onto the table from a roll of material.

In block 920, the first sheet portion may be temporarily secured to the first level of the table. For example, the first sheet portion may be secured to the table using clamps or other type of devices for preventing the first sheet portion from moving while it is being worked on.

In block 930, a tube portion having the tendon disposed therein may be adhered to the first sheet portion such that the tube portion is aligned with the indicator. For example, tube portion may be adhered to the first sheet portion using adhesives or in some embodiment a heat sealing technique. The indicator is used so that when the envelope gore is formed the tube portion is aligned with a centerline of the gore.

In block 940, a second sheet portion of the material may be positioned over the first sheet and tube portions arranged on the table. For example, after the tube portion is adhered to the first sheet, the second sheet may be rolled out from the roll of material. Just as in the first sheet, the second sheet portion may be manually or automatically rolled onto the table from the roll of material.

In block 950, the first and second sheet portions may be joined together, using a heat sealing device. The joined portions form an envelope gore such that the tendon is arranged proximate to a centerline of the gore. In this block, extra material not used for envelope gore may be cutaway using a cutting element.

In block 960, the gore portion of the balloon envelope may be positioned onto the second level of the table without affecting additional sheet portions of material to be arranged on the first level.

In block 965, it may be determined whether a sufficient number of envelope gores have been manufactured. For example, the sufficient number of envelope gores may be enough gores to create a complete balloon envelope. If a sufficient number of envelope gores have been manufactured, then the flow diagram 900 may stop. Otherwise, the flow diagram 900 may return to step 910 where construction of additional envelop gores may continue until there are enough gores assembled to create a complete balloon envelope.

Most of the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. An assembly for manufacturing a balloon envelope, the assembly comprising:

a table component having first and second levels, a curved heat sealing surface and an indicator disposed on the first level, the first level being arranged to receive a first sheet portion of material, the indicator being arranged along a lengthwise axis of the table component to indicate a position for attaching a tendon to the first sheet portion, and the second level being arranged to receive assembled gore portions of the balloon envelope comprising at least the first sheet portion, the tendon and a second sheet portion of material, at least a portion of the indicator being arranged closer to the second level than the curved heat sealing surface; and a sealing component, the sealing component being configured to move along the table component and to apply a heat seal to bond the first sheet portion to the second sheet portion of the material disposed at the curved heat sealing surface in order to form at least part of a gore portion of the balloon envelope, such that the tendon is arranged proximate to a centerline of the gore portion that runs along a longitudinal length of the gore portion between two seams.

2. The assembly of claim 1, wherein the sealing component is further configured to cut the first and second sheet portions at an edge of each sheet.

3. The assembly of claim 1, further comprising a track being arranged along the lengthwise axis of the table component, wherein the sealing component is configured to move along the track in order to heat seal the first and second sheet portions together.

4. The assembly of claim 1, wherein the table component includes a covering material that allows the first sheet portion to slide across the first level.

5. The assembly of claim 4, further comprising an airflow unit, the airflow unit, when activated, causing an amount of airflow to temporarily hold the first sheet portion in place relative to the first level of the table component.

6. The assembly of claim 5, wherein the covering material is configured to allow airflow from the airflow unit to reach the first sheet portion disposed on the first level of the table component.

7. The assembly of claim 1, further comprising a feeding track attached to the first level of the table component, the feeding track being arranged to guide a given tendon lengthwise within the indicator disposed on the first level.

8. A system, comprising:
a balloon having a balloon envelope; and
an assembly for use during manufacture of the balloon envelope, the assembly comprising:
a table component having first and second levels, a curved heat sealing surface, and an indicator disposed on the first level, the first level being arranged to receive a first sheet portion of material, the indicator being arranged along a lengthwise axis of the table component to indicate a position for attaching a tendon to the first sheet portion, and the second level being arranged to receive assembled gore portions of the balloon envelope comprising at least the first sheet portion, the tendon and a second sheet portion of material, at least a portion of the indicator being arranged closer to the second level than the curved heat sealing surface; and
a sealing component, the sealing component being configured to move along the table component and to apply a heat seal to bond the first sheet portion to the second sheet portion of the material disposed at the curved heat sealing surface in order to form at least part of a gore portion of the balloon envelope, such that the tendon is arranged proximate to a centerline of the gore portion that runs along a longitudinal length of the gore portion between two seams.

9. The system of claim 8, further comprising a track being arranged along the lengthwise axis of the table component, wherein the sealing component is configured to move along the track in order to heat seal the first and second sheet portions together.

10. The system of claim 9, wherein the sealing component is further configured to cut the first and second sheet portions at an edge of each sheet.

11. The system of claim 8, wherein the table component includes a covering material that allows the first sheet portion to slide across the first level.

12. The system of claim 11, further comprising an airflow unit, the airflow unit, when activated, causing an amount of airflow to temporarily hold the first sheet portion in place relative to the first level of the table component.

13. The system of claim 12, wherein the covering material is configured to allow airflow from the airflow unit to reach the first sheet portion disposed on the first level of the table component.

14. The system of claim 8, further comprising a feeding track attached to the first level of the table component, the feeding track being arranged to guide a given tendon lengthwise within the indicator disposed on the first level.

15. A method of manufacturing a balloon envelope, the method comprising:
arranging a first sheet portion of material across a table having first and second levels, a curved heat sealing surface, and an indicator disposed on the first level, the first level being arranged to receive a first sheet portion of material, the indicator being arranged along a lengthwise axis of the table to indicate a position for attaching a tendon to the first sheet portion, and the second level being arranged to receive assembled gore portions of the balloon envelope comprising at least the first sheet portion, the tendon and a second sheet portion of material, at least a portion of the indicator being arranged closer to the second level than the curved heat sealing surface;
securing the first sheet portion to the first level of the table;
adhering a tube portion having the tendon disposed therein to the first sheet portion such that the tube portion is aligned with the indicator;
positioning the second sheet portion of the material over the first sheet and tube portions arranged on the table; and
joining the first and second sheet portions together at the curved heat sealing surface, using a heat sealing device, the joined first and second sheet portions forming at least part of the gore portion of the balloon envelope such that the tendon in the tube portion is arranged proximate to a centerline of the gore portion that runs along a longitudinal length of the gore portion between two seams.

16. The method of claim 15, further comprising:
stacking the gore portion of the balloon envelope onto the second level of the table; and
arranging a third sheet portion of material across the first level of the table to create an additional gore portion of the balloon envelope.

17. The method of claim 15, wherein the heat sealing device is further configured to cut the first and second sheet portions along an edge of each sheet.

18. The method of claim 15, wherein the table includes a covering material that allows the first sheet portion to slide across the first level of the table.

19. The method of claim 18, wherein the table includes an airflow unit, the airflow unit, when activated, causing an amount of airflow to temporarily hold the first sheet portion in place relative to the first level of the table.

20. The method of claim 18, wherein the covering material is configured to allow airflow from the airflow unit to reach the first sheet portion disposed on the first level of the table.

* * * * *